J. Wood,
Making Glass Bottles.
Nº 54,991. Patented May 22, 1866.

Witnesses:
Lemuel W. Serrell
Chas H. Smith

Inventor:
John Wood

UNITED STATES PATENT OFFICE.

JOHN WOOD, OF BROOKLYN, NEW YORK.

IMPROVED MEANS FOR HOLDING GLASS BOTTLES.

Specification forming part of Letters Patent No. 54,991, dated May 22, 1866; antedated May 10, 1866.

*To all whom it may concern:*

Be it known that I, JOHN WOOD, of Brooklyn, in the county of Kings and State of New York, have invented, made, and applied to use a certain Improved Means of Holding Glass Bottles, &c., while being manufactured; and I do hereby declare the following to be a full, clear, and exact description of the same, reference being had to the annexed drawings, making part of this specification, wherein—

Figure 1:
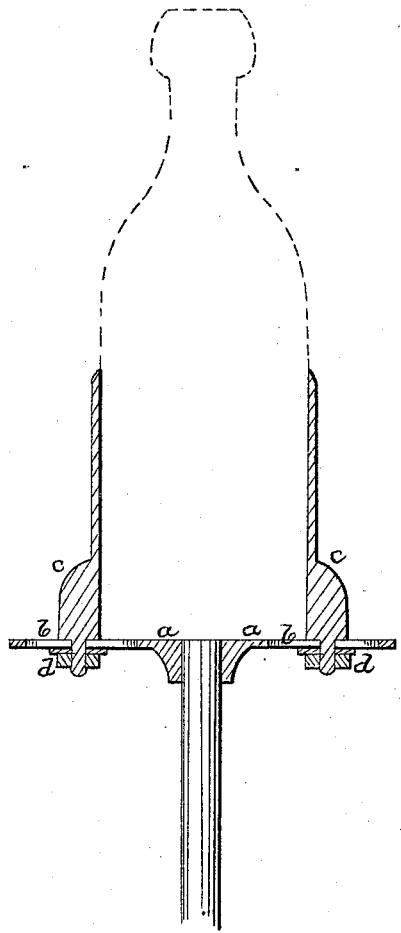
Figure 2:
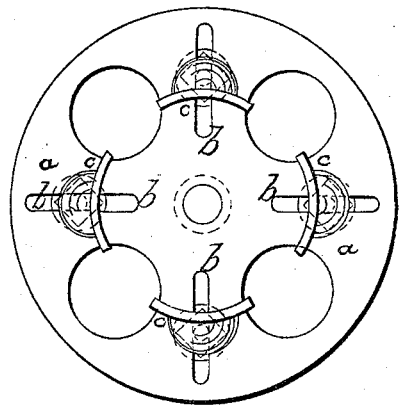

Figure 1 is a vertical section of my device, showing the position of the bottle in the holder; and Fig. 2 is a plan of said holder.

Similar marks of reference denote the same parts.

In the manufacture of glass bottles, wine-glasses, goblets, &c., it was formerly usual to blow the article, finish the bottom portion, and then apply the "pontee" rod with a small lump of melted glass to the bottom, to hold the said article while the neck-rim or upper part was finished by heat and suitable tools after it had been separated from the glass-blower's pipe. This operation involved the necessity of an attendant to apply the pontee-rod, and also left a rough place in the glass vessel where the pontee was broken off. To obviate this difficulty a holder has since been employed, formed of sheet metal, the size and shape of the bottle or other article, into which the same is placed while being finished up by the proper tools after being heated. These holders are only adapted to one size of article, and any change in the size renders it necessary to get a new holder.

The nature of my said invention consists in an adjustable holder for receiving the bottle or other article of glass while being heated and finished, said adjustable holder being adapted to the reception of various sizes and shapes of articles, and rendering the one holder adapted to all the purposes where a large number of the former holders would be indispensable.

In the drawings, $a$ is a plate or disk attached to the end of the pontee-rod, which disk has radiating slots $b$ $b$, through which pass the screws of the holders or clamps $c$, secured by a nut, $d$. These holders or clamps $c$ are to be formed with curved or concave inner faces when employed for circular or oval bottles or other articles, and may be adjusted with facility, so as to leave between them an opening of the size and shape required; or when the holder is to be used with square or prismatic articles the inner faces of these holders may be either flat or grooved or otherwise adapted to the peculiar shape of article.

This holder may only have two of the clamps $c$, or a greater number may be employed, and each one may be provided with spring to give sufficient friction to hold in the base of a wine-glass or other article while the brim or neck is heated and finished.

What I claim, and desire to secure by Letters Patent, is—

The adjustable holder for receiving and retaining articles of glass while being heated and formed, substantially as specified.

In witness whereof I have hereunto set my signature this 17th day of October, 1865.

JOHN WOOD.

Witnesses:
 CHAS. H. SMITH,
 GEO. D. WALKER.